Sept. 22, 1942. J. GASKELL 2,296,711
APPARATUS FOR FEEDING GLASS TO ROLLING MACHINES
Filed July 14, 1939
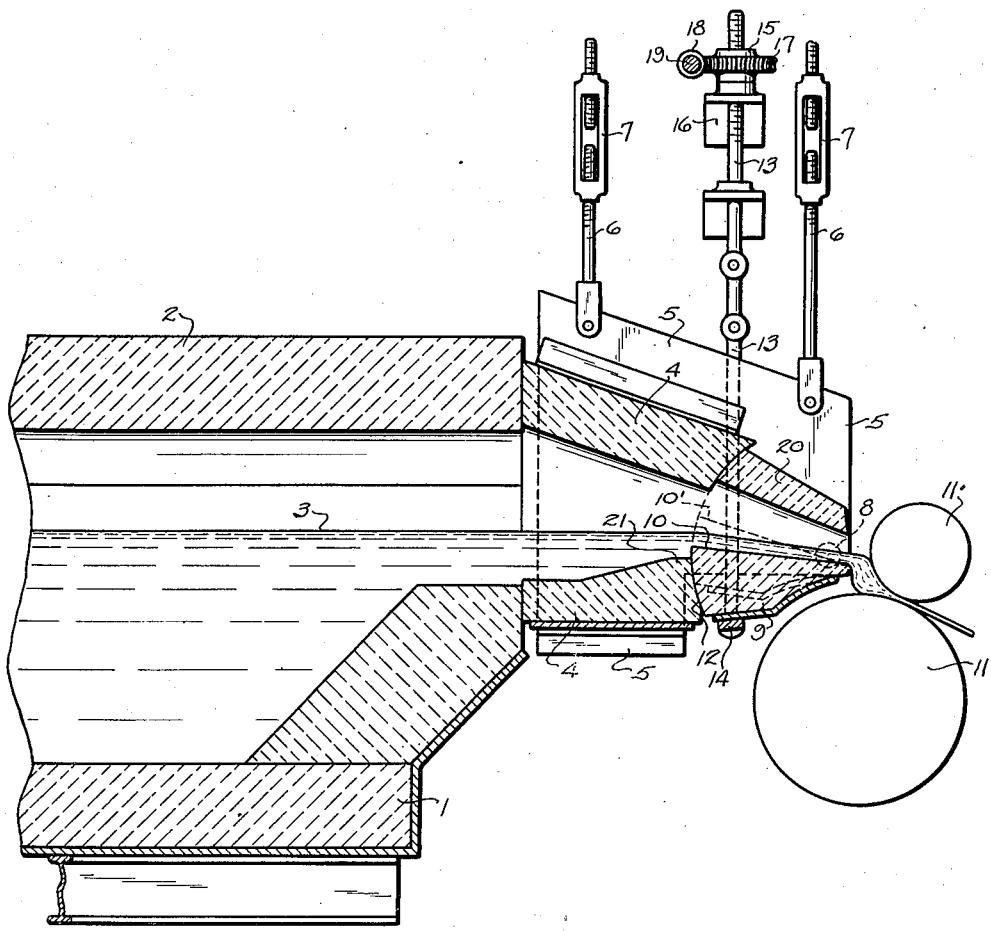
Inventor
JOSEPH GASKELL.
By Frank Fraser
Attorney Patented Sept. 22, 1942

2,296,711

UNITED STATES PATENT OFFICE

2,296,711

APPARATUS FOR FEEDING GLASS TO ROLLING MACHINES

Joseph Gaskell, St. Helens, England, assignor to Pilkington Brothers Limited, Liverpool, England, a limited-liability company of Great Britain Application July 14, 1939, Serial No. 284,516
In Great Britain August 24, 1938

9 Claims. (Cl. 49—55)

This invention relates to apparatus for feeding glass to a rolling machine, and has for its object improved apparatus for shutting off the flow of glass and for controlling the rate of feed.

It is applicable to that type of feeding apparatus in which the outlet from a glass tank is a spout which is slightly below the level of the glass, so that the glass flows through the spout onto the rollers of the rolling machine.

Heretofore in such apparatus, the flow of glass through the spout has been controlled by means of a fireclay gate placed behind the spout, which can be lowered from above so that its bottom edge can be brought into contact with the sole of the passage leading to the spout, to shut off the supply of glass, or can be adjusted to leave a narrow slot through which the glass flows to the spout.

The glass flowing through this slot erodes the bottom edge of the gate and also the sole of the passage, and the erosion is greater near the center, where the rate of flow is higher, than at the ends. Consequently, the bottom edge of the gate and the sole become concave, and the gate can no longer shut off the flow completely, but, when closed as far as possible, allows a thin stream of glass to pass, which covers the whole surface of the spout and freezes there.

Before restarting the flow of glass, this frozen glass has to be removed by melting it by burners to avoid its spoiling the fresh glass, and this removal of the frozen glass is a troublesome and lengthy operation.

According to the invention, the spout is mounted in front of the outlet of the tank so that it can be tilted about an axis near the outlet of the spout, whereby the back end of its bottom can be adjusted in height below the glass level, to control the rate of flow of glass from the tank, or can be raised above the glass level to shut off the glass from the spout.

The accompanying drawing is a longitudinal vertical section of the front portion of a tank with spout according to the invention.

The tank has the bottom 1 and roof 2 and contains glass up to the level 3. At the front end of the tank is an outlet in the form of an independent channel piece 4, supported on side frames 5 which are suspended from the superstructure by rods 6 with adjusting means 7. The frames 5 carry pivots 8 at which is pivoted the spout 9 with bottom 10. The spout is shown feeding glass by natural flow to a rolling machine with rolls 11. The back end of the spout is of convex cylindrical form at 12, the pivot 8 being on the axis of the cylinder, and it fits the corresponding concave cylindrical front end of the channel piece 4. Thereby, the spout can be turned on its pivot 8. The spout is supported by rods 13 at the ends of a cross bar 14, and the rods 13 are screw-threaded at their upper ends, where they pass through nuts 15 supported on brackets 16 on side supports which are not shown. Worm wheels 17 on the nuts 15 are engaged by worms 18 on a transverse rod 19, by means of which the nuts 15 can be turned to raise or lower the back end of the spout by turning it about its pivot 8.

By this means the spout can be tilted from the position shown, with its bottom at 10, to the position shown in dotted lines with its bottom at 10', and in this position the glass in the tank is entirely shut off from the spout, so that no leakage of glass into the spout is possible. Further, the effectiveness of the shut off is not affected by any erosion of the back edge or end of the bottom 10, because the lowest point of this can be raised above glass level.

The same tilting movement of the spout is used for controlling the rate of flow of glass down the spout by varying the depth of the back end of the bottom 10 below the glass level 3. By this means the rate of flow can be controlled more accurately than is possible by the customary method of varying the depth of a gate below the surface of the glass. For a given rate of flow, the height of glass above the bottom 10 is greater than the height of the flow below the gate, because the glass is under a lesser head, and therefore a given movement of the back end of the bottom 10 has less effect on the flow than an equal movement of a gate.

The tilting spout has the further advantage that the glass has an unbroken surface from the tank to the outlet of the spout and consequently the glass flowing down the spout is more uniform in temperature and more free from impurities resulting from erosion than when it passes under a gate.

The spout 9 is shown with integral cover 20, but the cover may be independent and fixed.

In the construction shown, the whole channel piece 4, with the spout can be raised or lowered slightly by the adjusting means 7, in order to vary the height of the outlet of the spout relatively to the rolls 11. This construction, however, is not an essential part of the invention and, where such adjustment is not required, the spout may be pivoted at a fixed point. The point 21 is deemed to be the outlet of the tank whether the channel piece 4 is movable or is an integral part of the tank structure.

The pivot of the spout is preferably placed as shown, so near to the outlet of the spout that the tilting movement of the spout to control the rate of flow does not materially alter the height of the outlet.

I claim:

1. Glass tank having an outlet with spout formed with a passage therethrough open at its opposite ends adapted to feed a sheet forming apparatus by continuous flow of glass from the tank through the passage in said spout, comprising means for mounting the spout in front of the outlet of the tank for tilting movement about an axis near the outer end of the spout, whereby the back end of its bottom can be adjusted in height below the glass level, to control the rate of flow of glass from the tank through said spout to the forming apparatus, or can be raised above the glass level to shut off the flow of glass through the spout.

2. Glass tank as in claim 1, characterized by the spout being pivoted on an axis nearer to its outer end than to the back end thereof on pivots fixed relatively to the outlet of the tank, and by the back end of the spout being of cylindrical form with the axis of the cylinder on the pivotal axis and fitting a concave cylindrical portion formed on the outlet of the tank.

3. Glass tank as in claim 1, characterized by the outlet of the tank being in a channel piece movable up and down relatively to the main tank structure.

4. Glass tank with spout formed with a passage therethrough open at its opposite ends adapted to feed a sheet forming apparatus by continuous flow of glass from the tank through the passage in said spout, means for adjustably mounting said spout in such a manner that the back end of the bottom thereof can be raised above the glass level to shut off the flow of glass from the spout without materially altering the height of the outer end of said spout.

5. Glass tank with spout formed with a passage therethrough open at its opposite ends adapted to feed a sheet forming apparatus by continuous flow of glass from the tank through the passage in said spout, means for pivotally mounting said spout adjacent its outer end so that the back end of its bottom can be raised above the glass level to shut off the flow of glass from the spout without materially altering the height of the outer end of said spout.

6. Glass tank having an outlet and a spout formed with a passage therethrough open at its opposite ends adapted to feed a sheet forming apparatus by continuous flow of glass from the tank through said outlet and passage in said spout, means for pivotally mounting said spout in such a manner that the back end of the bottom thereof can be raised above the glass level to shut off the flow of glass from the spout without materially altering the height of the outer end of said spout, the back end of the said spout being of cylindrical form and fitting a complemental cylindrical portion formed on the said outlet.

7. Glass tank having an outlet and a spout formed with a passage therethrough open at its opposite ends adapted to feed a sheet forming apparatus by continuous flow of glass from the tank through said outlet and passage in said spout, means for pivotally mounting said spout adjacent its outer end so that the back end of its bottom can be raised above the glass level to shut off the flow of glass from the spout without materially altering the height of the outer end of said spout, the back end of the said spout being of cylindrical form and fitting a complemental cylindrical portion formed on the said outlet, and means for adjusting said spout bodily vertically.

8. Glass tank having a spout formed with a passage therethrough open at its opposite ends adapted to feed a sheet forming apparatus by continuous flow of glass from the tank through the passage in said spout, means for pivotally mounting said spout adjacent its outer end so that the back end of its bottom can be adjusted in height below the glass level to control the rate of flow of glass from the tank through said spout to the forming apparatus and without materially altering the height of the outer end of said spout.

9. Glass tank having an outlet and a spout formed with a passage therethrough open at its opposite ends adapted to feed a sheet forming apparatus by continuous flow of glass from the tank through said outlet and passage in said spout, means for pivotally mounting said spout adjacent its outer end so that the back end of its bottom can be adjusted in height below the glass level to control the rate of flow of glass from the tank through said spout to the forming apparatus or can be raised above the glass level to shut off the flow of glass through said spout without materially altering the height of the outer end of the spout, and means for mounting said outlet and spout for bodily vertical movement as a unit.

JOSEPH GASKELL.